Figure 1:
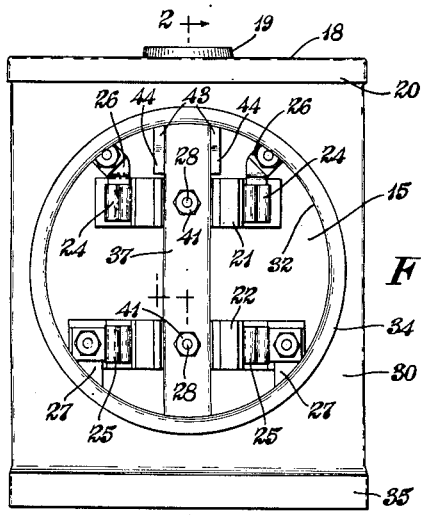

Dec. 2, 1952 V. J. LAJEUNESSE ET AL 2,620,377
SAFETY DEVICE FOR ELECTRIC METER TROUGH COVERS
Filed Aug. 10, 1949 2 SHEETS—SHEET 1

INVENTORS
Victor J. Lajeunesse,
Harold M. Rutledge and
Raymond T. Trier
BY Freast and Bishop
ATTORNEYS

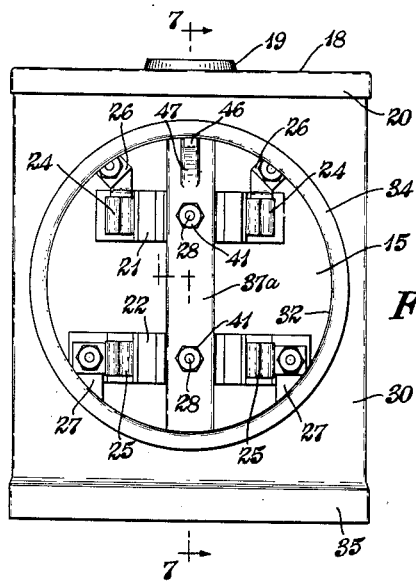
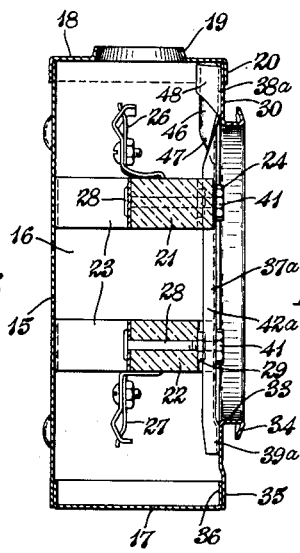
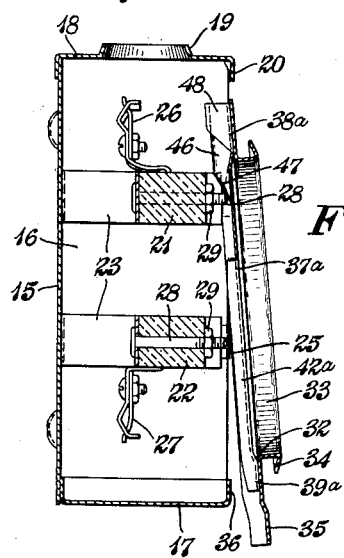
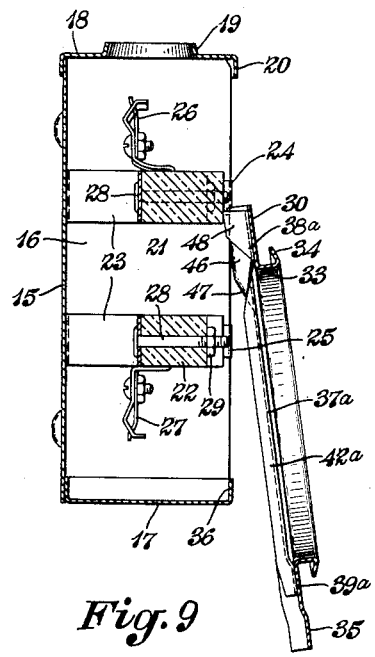
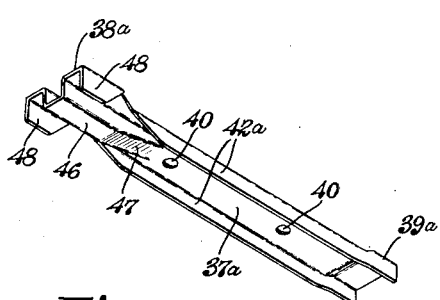

Patented Dec. 2, 1952

2,620,377

UNITED STATES PATENT OFFICE 2,620,377

SAFETY DEVICE FOR ELECTRIC METER TROUGH COVERS

Victor J. Lajeunesse, Hills and Dales, Harold M. Rutledge, Canton, and Raymond T. Trier, North Canton, Ohio, assignors to The Superior Switchboard & Devices Company, Canton, Ohio, a corporation of Ohio Application August 10, 1949, Serial No. 109,448

4 Claims. (Cl. 174—50)

The invention relates to improvements in the cover for the trough of a socket type of electric meter installation, and more particularly to a safety device carried by the cover and adapted to prevent the cover from accidentally coming into contact with the energized terminals in the trough, when the cover is being removed from the trough.

Meter installations, of the general type to which the invention pertains, comprises a trough within which are located terminal clips, mounted upon insulation blocks, a detachable cover being provided for the trough and having a circular opening therein with a flanged ring surrounding the opening.

A diametrically disposed cross bar or bridge is connected to the underside of the cover, across said circular opening, and adapted to be detachably connected to the insulation blocks by bolts, screws, or the like, to secure the cover upon the trough.

The meter used in such installations is of the back connected or socket type and is mounted upon the flanged ring of the cover and provided upon its rear side with contact pins or posts which are inserted through said opening and engaged in the terminal clips within the trough.

In the conventional construction above briefly described, there is danger of short circuiting the energized terminal clips within the trough when the cover is being removed from the trough, which may often cause property damage or personal injury.

These installations are usually mounted upon a wall with the axis of the meter in a horizontal plane, the trough cover with the socket ring thereon being located in a vertical plane, with the cross bar or bridge located vertically therethrough so that the upper portion thereof is detachably connected to the insulation block, carrying the line terminal clips and the lower portion is in like manner connected to the insulation block, carrying the load terminal clips.

When it is desired to have access to the interior of the trough, the meter is first removed and then the bolts or screws attaching the cross bar or bridge to the insulation blocks must be disconnected before the cover can be removed from the trough.

When these bolts or screws are disconnected the cover may slide downwardly, permitting the socket ring to touch one or both of the energized terminal clips in the trough causing injury to the operator or property damage.

Even though the cover may not accidentally slide downwardly into contact with the energized clips, it is necessary that the operator be very careful in removing the cover so as not to permit the socket ring thereof to come into contact with the terminal clips in the trough.

It is an object of the present invention to provide means for guiding the cover outwardly away from the trough, as the cover is removed from the trough, so as to prevent the cover and socket ring from coming into contact with the terminal clips in the trough, thus eliminating all risk of danger or injury due to short circuiting of the energized terminal clips.

Another object is to provide runners upon the underside of the cross bar or bridge to ride over the insulation block or the bolt or screw therein, as the cover is removed, so as to positively prevent the cover from coming into contact with the energized terminals carried by the block.

Figure 2:
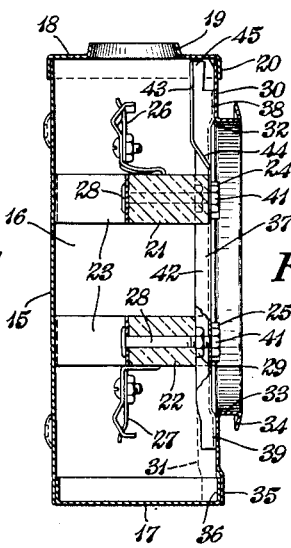
Figure 3:
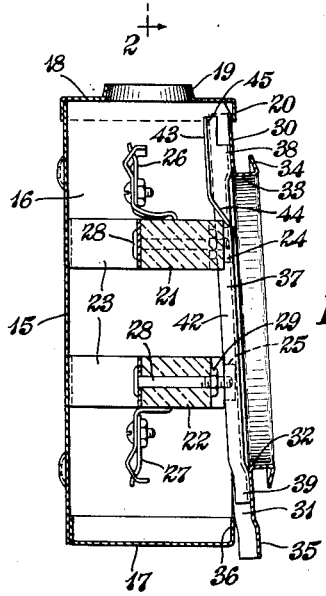
Figure 4:
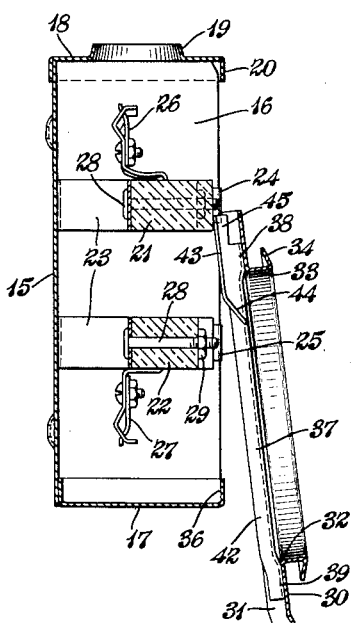
Figure 5:
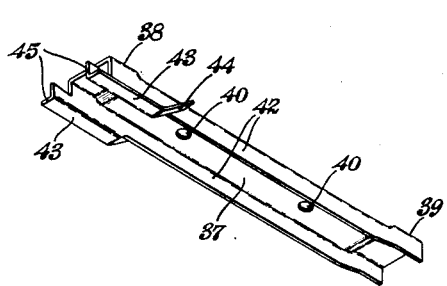

The above objects together with others which will be apparent from the drawings and following description, or which may be later referred to, may be attained by constructing the device in the manner hereinafter described in detail and illustrated in the accompanying drawings, in which:

Figure 1 is a front elevation of a meter trough with the cover mounted thereon, the meter being removed for the purpose of illustration;

Fig. 2 a section through the trough and cover taken as on the line 2—2, Fig. 1;

Fig. 3 a similar section showing the cover in the position it assumes as the operator starts to remove the cover from the trough, showing the runners upon the cross bar riding over the upper corner of the insulation block to guide the cover away from the energized terminal clips upon the block;

Fig. 4 a similar view showing the cover in a further removed position with the upper end portions of the runners riding over the outer surface of the insulation block and holding the cover out of contact with the energized clips;

Fig. 5 a detached, inverted, perspective view of the cross bar or bridge with the runners thereon for guiding the cover away from the terminals as it is removed from the trough;

Fig. 6 a front elevation of a trough with cover thereon showing a slightly modified form of the invention in which a runner upon the cross bar or bridge is adapted to ride over the outer end of the bolt or screw which secures the cover to the trough;

Fig. 7 a section taken as on the line 7—7, Fig. 6;

Fig. 8 a similar section showing the cover as it is started to be removed from the trough, with the runner engaging the outer end of the bolt upon the insulation block and guiding the cover away from the energized clips in the trough;

Fig. 9 a similar view showing the cover in a further position of removal, after the runner has passed out of contact with the bolt, showing the side runners upon the cross bar contacting the outer surface of the insulation block so as to continue to hold the cover out of contact with the energized terminal clips in the trough; and Fig. 10 a detached, inverted, perspective view of the cross bar or bridge provided with the safety device shown in Figs. 6 to 9.

Referring first to the construction illustrated in Figs. 1 to 5 of the drawings, in which similar numerals refer to similar parts throughout, a conventional trough is illustrated, formed of sheet metal and comprising the back wall 15, side walls 16, bottom wall 17 and top wall 18 provided with an opening 19 through which line wires may be located as in usual practice. The top wall 18 is preferably provided with the usual depending overhanging flange 20, spaced slightly outward from the outer edges of the side walls 16, as in usual practice.

The usual insulation terminal blocks 21 and 22 are mounted within the trough, as by means of brackets 23 attached to the back wall 15, and conventional terminal clips 24 and 25 respectively are carried thereby for engaging the contact pins or posts of the meter. Any suitable terminal connections 26 and 27 are connected to the terminal clips 24 and 25 respectively for attaching the line wires and load wires as in usual practice.

Each insulation block is attached to the corresponding bracket 23 by means of a bolt 28, and a nut 29 thereon, the end of the bolt extending out beyond the nut for a purpose to be later described.

The cover 30 for the trough is formed of sheet metal and provided with the usual flanges 31 at its sides for engagement over the side edges 16 of the trough and has a circular opening 32 therein surrounded by the usual socket ring 33 having a peripheral flange 34 thereon, as in usual practice.

The lower end portion of the cover may be offset as indicated at 35, in customary manner, to engage over the upturned flange 36 upon the bottom wall in a single installation as illustrated, or to receive the upper edge of the next adjacent cover in a multiple installation. This is only described to clarify the construction and forms no part of the present invention.

The usual cross bar or bridge 37 is located diametrically across the circular opening 32, in a vertical position as viewed in the drawings, and the outwardly offset ends 38 and 39 thereof are rigidly attached to the inner or under surface of the cover in any suitable manner, as by welding or the like.

When the cover is placed upon the trough, as shown in Figs. 1 and 2, the upper edge of the cover is received beneath the depending flange 20 of the trough, the outwardly offset lower edge portion 35 is engaged over the flange 36 of the trough and the side flanges 31 of the cover are engaged over the side walls 16 of the trough.

The cross bar or bridge 37 is provided with spaced apertures 40 which receive the outer end portions of the bolts or screws 28 and nuts 41 are mounted upon said bolts or screws for securing the cover upon the trough.

When it is desired to remove the cover, the nuts 41 are removed and the lower end of the cover is swung outward sufficiently to disengage the apertures 40 of the cross bar or bridge from the bolts 28.

The operator then slides the cover downward to disengage the upper edge thereof from the flange 20 of the trough, so that the cover may be removed, and unless he is extremely careful the cover will tend to slide downwardly permitting the socket ring 33 thereof to come into contact with the energized line terminal clips 24, causing a short circuit with personal injury to the operator, which may be fatal, and property damage, which may be extensive.

The present invention comprises a safety device which will guide the cover away from the terminal clips of the trough and which will positively prevent any part of the cover from contacting these terminal clips.

This safety device, as shown in Figs. 1 to 5, comprises a pair of runners mounted upon the upper end of the usual inturned flanges 42 of the cross bar or bridge. These runners may be in the form of flat flanges 43 integrally formed upon the upper portions of the inturned flanges 42 of the bridge, the lower ends of said runners being downwardly and outwardly angled as at 44.

With this construction, when the nuts 41 are removed from the bolts 28 and the lower end of the cover is swung outwardly to disengage the cross bar or bridge 37 from the ends of the bolts 28, downward movement of the cover to disengage the upper edge thereof from the flange 20 of the trough, will cause the inclined lower ends 44 of the runners to ride over the upper corners of the insulation block 21, as shown in Fig. 3, guiding the cover outwardly away from the energized clips 24.

Further downward movement of the cover will cause the flat portions 43 of the runners to ride over the front surface of the insulation block 21, holding the cover outward away from the clips 24, and as the cover is moved downward to the position shown in Fig. 4 the upper extensions 45 of the runners, which extend above the upper end of the cross bar or bridge, will ride over the outer surface of the insulation block 21 continuing to hold the cover outward away from the clips 24 until the cover is moved downward below the insulation block 21.

With this construction it will be seen that even though the cover accidentally slides downward, after the cross bar thereof is disengaged from the bolts 28, no part of the cover can come into contact with the clips 24.

Not only is the cover guided outward away from the energized terminal clips by these runners, but they will prevent the cover from being moved into contact with the terminal clips at any time during the removal of the cover from the trough or replacing it thereon.

In the form of the invention shown in Figs. 6 to 10, both the trough and the cover may be the same as shown in Figs. 1 to 5, and the same reference numerals are applied thereto, the only change being in the cross bar or bridge 37a upon which the safety device is formed or mounted.

This cross bar is preferably provided with the outwardly offset upper and lower end portions 38a and 39a, which are welded or otherwise rigidly attached to the upper and lower end portions of the cover, and the usual inturned flanges 42a may be formed at the side edges of the cross bar.

In this form of the invention the runner may comprise a rib 46, centrally located upon upper end portion of the cross bar or bridge, and either integrally formed thereon, as shown in the drawings, or rigidly attached thereto, the lower end of said rib being downwardly and outwardly inclined as shown at 47.

The inturned flanges or runners 48 are formed at opposite sides of the upper end of the cross bar, being located upon opposite sides of the upper end of the rib or central runner 46 and spaced therefrom as best shown in Fig. 10.

When it is desired to remove the cover from the trough, after the nuts 41 have been removed from the outer ends of the bolts or screws 28, the lower end of the cover is swung outward as above described and moved downward to disengage the upper edge thereof from the flange 20 of the trough.

As shown in Fig. 8, as the cover is thus moved down, the inclined lower portion 47 of the central rib or runner 46 will ride over the end of the bolt 28, in the insulation block 21, guiding the cover outward away from the terminal clips 24, and further downward movement of the cover will cause the flat upper portion of the rib or runner 46 to ride over the end of said bolt.

As shown in Fig. 9, as the upper end of the rib or runner 46 passes out of contact with the end of the screw 28, the side runners or flanges 48 will contact the outer surface of the insulation block 21, continuing to hold the cover outward away from the terminal clips 24 until the cover has been moved downward beyond said clips.

We claim:

1. The combination with an electric meter trough having an insulation block therein with energized terminals thereon, and a cover for the trough having a socket ring therein and a vertically disposed bridge bar located diametrically across said socket ring and connected at opposite ends to the inner side of the cover, of a safety device comprising a runner carried upon the inner side of the upper portion of the bridge bar and having a straight vertical portion located in a vertical plane disposed inwardly from the outer end of the insulation block and extending from the upper end of the cover to a point above the insulation block and then inclined downwardly and outwardly to a point adjacent to the insulation block, whereby when the cover is moved downward relative to the trough said inclined portion of the runner will immediately ride over the insulation block guiding the cover outwardly away from the energized terminals, after which the straight vertical portion of the runner will ride over the insulation block holding the cover outwardly away from the energized terminals until the cover has moved downward entirely below said terminals.

2. The combination with an electric meter trough having an insulation block therein with energized terminals thereon and a cover for the trough having a socket ring therein and a vertically disposed bridge bar located diametrically across said socket ring and connected at opposite ends to the inner side of the cover, of a safety device comprising a spaced pair of flanges forming runners at opposite sides of the inner side of the upper portion of the bridge bar and each having a straight vertical portion located in a vertical plane disposed inwardly from the outer end of the insulation block and extending from the upper end of the cover to a point above the insulation block and then inclined downwardly and outwardly to a point adjacent to the insulation block, whereby when the cover is moved downward relative to the trough said inclined portions of the runners will immediately ride over the insulation block guiding the cover outwardly away from the energized terminals, after which the straight vertical portions of the runners will ride over the insulation block holding the cover outwardly away from the energized terminals until the cover has moved downward entirely below said terminals.

3. The combination with an electric meter trough having an insulation block therein with energized terminals thereon and a cover for the trough having a socket ring therein and a vertically disposed channel shape bridge bar located diametrically across said socket ring and connected at opposite ends to the inner side of the cover, of a safety device comprising oppositely disposed flanges upon the edges of the channel shape bridge bar forming runners at the inner side of the upper portion of said bridge bar, each runner having a straight vertical portion located in a vertical plane disposed inwardly from the outer end of the insulation block and extending from the upper end of the cover to a point above the insulation block and then inclined downwardly and outwardly to a point adjacent to the insulation block, whereby when the cover is moved downward relative to the trough said inclined portions of the runners will immediately ride over the insulation block guiding the cover outwardly away from the energized terminals, after which the straight vertical portions of the runners will ride over the insulation block holding the cover outwardly away from the energized terminals until the cover has moved downward entirely below said terminals.

4. The combination with an electric meter trough having an insulation block secured therein by a bolt, with energized terminals thereon and a cover for the trough having a socket ring therein and a vertically disposed bridge bar located diametrically across said socket ring and connected at opposite ends to the inner side of the cover, of a safety device comprising a central channel shape runner formed upon the inner side of the upper portion of the bridge bar and having a straight vertical portion located in a vertical plane disposed inwardly from the outer end of the insulation block and extending from the upper end of the cover to a point above the insulation block and then inclined downwardly and outwardly to a point adjacent to the insulation block, and a pair of inwardly disposed flanges spaced from opposite sides of the upper end of said central runner and forming runners with vertical inner edges located in a vertical plane disposed inwardly from the outer end of the insulation block, whereby when the cover is moved downward relative to the trough the inclined portion of the central runner will immediately ride over the end of the bolt in the insulation block guiding the cover outwardly away from the energized terminals, and then the straight vertical portion of the central runner will ride over said bolt after which the straight vertical edges of said flanges will ride over the insulation block holding the cover away from said terminals until the cover has moved downward entirely below said terminals.

VICTOR J. LAJEUNESSE.
HAROLD M. RUTLEDGE.
RAYMOND T. TRIER.

REFERENCES CITED

The following references are of record in the file of this patent:

UNITED STATES PATENTS

| Number | Name | Date |
|---|---|---|
| 2,201,435 | Guyton | May 21, 1940 |
| 2,223,023 | Weileman | Nov. 26, 1940 |
| 2,349,645 | Young | May 23, 1944 |